UNITED STATES PATENT OFFICE.

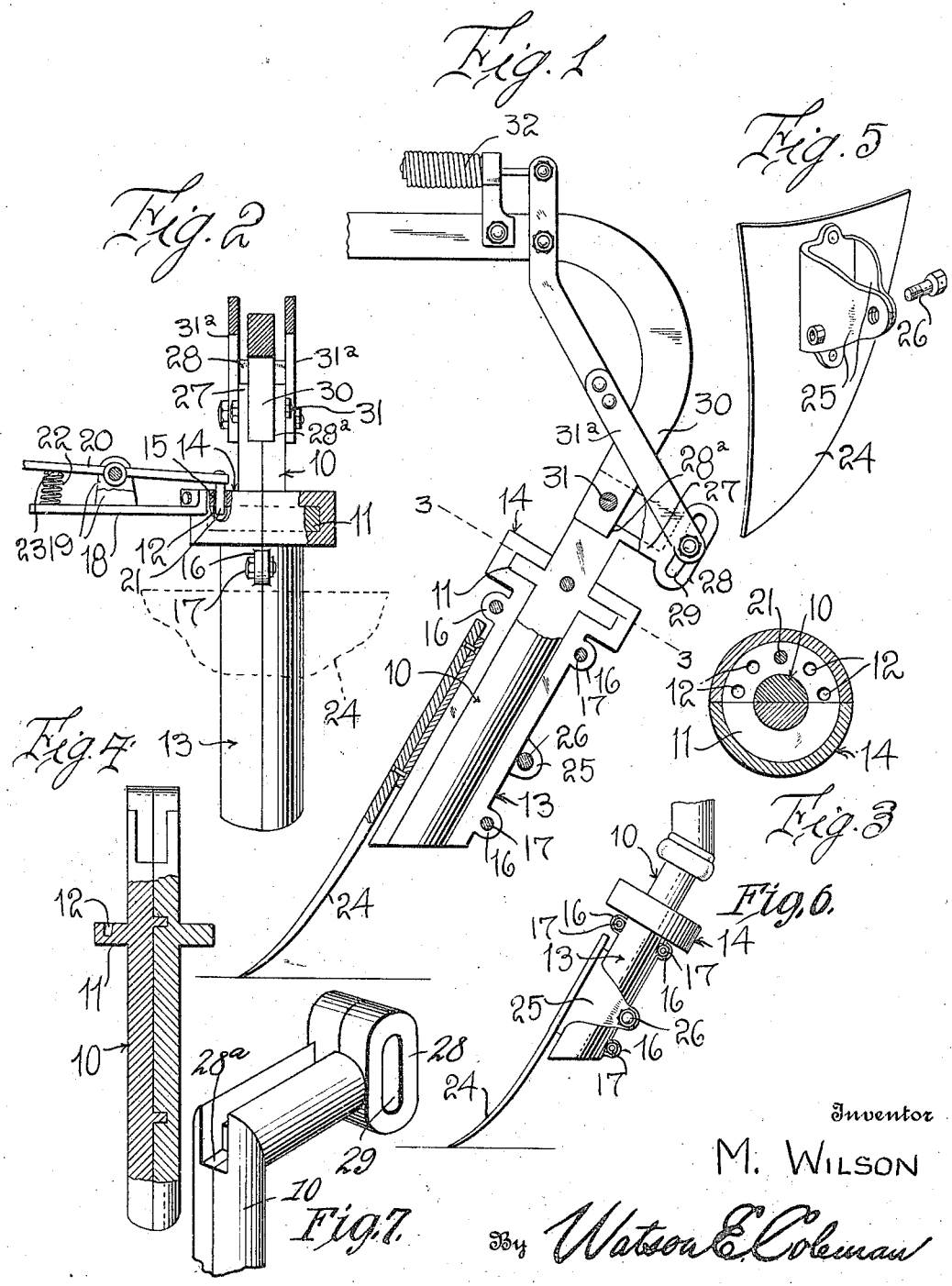

MATTHEW WILSON, OF HOLTON, KANSAS.

ADJUSTABLE CULTIVATOR-SHANK.

1,236,640.   Specification of Letters Patent.   Patented Aug. 14, 1917.

Application filed October 23, 1916. Serial No. 127,183.

*To all whom it may concern:*

Be it known that I, MATTHEW WILSON, a citizen of the United States, residing at Holton, in the county of Jackson and State of Kansas, have invented certain new and useful Improvements in Adjustable Cultivator-Shanks, of which the following is a specification, reference being had to the accompanying drawings.

This invention relates to cultivators and particularly to the shanks for supporting the cultivator shovels.

The general object of the invention is the provision of means whereby the inclination of a shovel to the line of draft may be adjusted without the necessity of removing bolts or nuts, thus making the cultivators adjustable for a large variety of work and permitting the ready adjustment of the cultivator blades or shovels.

Other objects will appear in the course of the following description.

My invention is illustrated in the accompanying drawings, wherein,

Figure 1 is a side elevation of the rear end of a cultivator beam with my improved shovel shank applied thereto, the shovel being in section and one of the sections of the barrel being moved;

Fig. 2 is a front view of the cultivator shank, the beams and the rods 31 being in section and the barrel being partly broken away;

Fig. 3 is a sectional view on the line 3—3 of Fig. 1;

Fig. 4 is an elevation of the shank 10 partly in section;

Fig. 5 is a perspective view of one of the shovel blades;

Fig. 6 is a side elevation showing the application of my invention to an adjustable cultivator shank.

Fig. 7 is a perspective view of the upper end of the cultivator shank.

In these figures I have illustrated a portion of a cultivator beam with one of the shovel shanks connected thereto. 10 designates the shovel shank proper which may be so formed as to be readily attached to the cultivator beam in any suitable manner and so formed as to provide for the angular movement of the shank relative to a horizontal plane. The shank 10 is preferably formed in two sections and is provided intermediate its ends with a collar 11 circular in form and provided with a plurality of perforations or sockets 12. Surrounding the lower portion of the shank and the collar 11 is a barrel 13, enlarged at its upper end to provide a circular chamber for the collar 11, the wall of the chamber being designated 14, the upper wall of this circular chamber being provided with a perforation 15. The barrel 13 is preferably made in two sections so as to be readily applied to or removed from the shank, these sections being provided with ears 16 through which bolts 17 pass for holding the sections together and in engagement with the shank.

Projecting from the enlarged portion of the shank is a bracket 18 having upwardly extending ears 19 upon which is mounted a locking lever 20, the inner end of which is provided with a latch bolt 21 extending through the perforation 15 and adapted to engage in any one of the sockets or recesses 12, these sockets or recesses being arranged in concentric relation to the axis of the shank 10. A spring 22 is also mounted upon the bracket and bears upward against the outer end of the lever 20, the upper end of the spring surrounding a stud 23, this spring acting to force the bolt 21 downward and into engagement with the corresponding recess or socket 12. Attached to the barrel 13 in any suitable manner is a cultivator blade or shovel 24 which may be of any suitable form, the form not being material. As illustrated, this shovel 24 is attached to the barrel 13 by means of clip 25 which extends around from the back of the shovel and embraces the barrel and is held in place upon the barrel by means of a transverse bolt 26. This is an ordinary manner of attaching cultivator shovels to shanks and I do not wish to be limited to this construction.

At its upper end the shank 10 is formed with a rearwardly extending arm 27. The upper face of this arm is longitudinally grooved as at 28$^a$, this groove opening upon the front face of the shank, and the groove immediately above the shank being slightly deeper than along the remainder of the arm. At its extremity the arm 27 is formed with a head 28 having a slot 29. The lower end of the beam 30 of the cultivator is formed to fit within the recess 28 and be pivoted to the shank by means of a bolt 31. The groove 28$^a$ formed in the upper end of the arm will permit the cultivator shank to turn in a vertical plane so that the cultivator shank will yield if it strikes a stone. Extending upward on each side of the beam 30 are the levers 31ª which are pivoted to the beam at their upper end and are operatively connected to a spring 32 which normally holds the cultivator shank in its proper normal position but which yields when the cultivator shank strikes a stone to thereby permit the cultivator shank to turn rearward. This is a common construction and no part of my present invention. It is obvious that the shank may be used without this spring trip as illustrated in Fig. 6, where the shank is illustrated as connected adjustably to the cultivator beam. It will be understood that my invention is not limited to use with the spring trip mechanism or to being either rigidly or adjustably connected to the cultivator beam but may be applied to any cultivator tooth shank.

By means of the mechanism described the angle of the cultivator shovel to the line of draft may be readily adjusted by simply depressing the outer end of the lever 20 and thus releasing the bolt 21 from its engagement with the collar 11 and then rotating the barrel with relation to the shank 10 until the proper angle has been secured. Then the lever 20 is released so that the spring 22 will force the bolt 21 into engagement with the proper recess. By means of my invention the angle of cultivator shovels to the line of draft may be readily adjusted without the necessity of using a wrench and unscrewing the nuts or bolts holding the cultivator shovels in place. I do not wish to be limited to any particular means for holding the cultivator shovel upon the barrel nor holding the shank 10 upon the cultivator frame as various means may be used for this purpose, nor do I wish to be limited to making the shank 10 in two sections, as illustrated in Fig. 4, as the shank with the collar may be formed in one piece.

Having described my invention, what I claim is:

1. A cultivator shank having a circular collar formed with a plurality of perforations concentric to the axis of the shank, a rotatable barrel mounted upon the shank and intermediate of its ends being formed with an enlarged circular chamber, one wall of said chamber being formed with a perforation adapted to register with any of the perforations of the collar, a cultivator blade mounted upon the barrel, means mounted on the barrel and projecting from it whereby the barrel may be turned, and a locking bolt mounted on said means and engaging through the perforation of the wall of said chamber and through any one of the perforations in the collar and adapted to hold the barrel thereto in a plurality of adjusted positions upon the shank.

2. A cultivator shank having a collar formed with a plurality of sockets disposed concentric to the axis of the shank, a barrel surrounding the lower portion of the shank and having a chamber inclosing the collar, one wall of the chamber being formed with a perforation, a cultivator blade mounted upon the barrel, a lever mounted upon the barrel and having a bolt adapted to pass through the perforation in the barrel and into any one of the sockets in said collar, and a spring normally urging the bolt into its locking position.

3. A cultivator shank formed with a recess at its upper end and with a laterally extending arm provided with a transversely perforated head, the arm being grooved upon its upper face, the groove opening into said recess, a cultivator blade supporting member surrounding the shank and rotatable thereon, and means for holding the supporting member in rotatably adjusted positions upon the shank.

4. The combination with a cultivator beam having a downwardly extending end, of a cultivator shank having a rearwardly extending arm at its upper end, the arm being grooved to receive the lower end of the beam, said groove extending to the forward face of the shank, the rear end of the arm being provided with a head slotted parallel to the axis of the shank, a cultivator blade supporting member surrounding the shank and rotatable thereon, a pivot pin passing through the end of the beam and through the grooved upper end of the shank, a lever pivoted to the beam extending above the beam, the lower end of the lever having a bolt passing through the slot in the head of the shank, and a spring drawing the upper end of the lever forwardly, said spring acting to yieldingly hold the shank from pivotal movement on the beam.

In testimony whereof I hereunto affix my signature in the presence of two witnesses.

MATT WILSON.

Witnesses:
G. W. HAMILTON,
ELISHA SCOTT.

Copies of this patent may be obtained for five cents each, by addressing the "Commissioner of Patents, Washington, D. C."